(12) United States Patent
Delfyett et al.

(10) Patent No.: US 7,777,940 B1
(45) Date of Patent: Aug. 17, 2010

(54) EXTREME CHIRPED PULSE AMPLIFICATION AND PHASE CONTROL

(75) Inventors: Peter J. Delfyett, Orlando, FL (US); Scott Rozzo, St. Cloud, FL (US)

(73) Assignee: University of Central Florida Research Foundation, Inc., Orlando, FL (US)

( * ) Notice: Subject to any disclaimer, the term of this patent is extended or adjusted under 35 U.S.C. 154(b) by 411 days.

(21) Appl. No.: 12/028,417

(22) Filed: Feb. 8, 2008

Related U.S. Application Data

(60) Provisional application No. 60/900,634, filed on Feb. 9, 2007.

(51) Int. Cl.
*H04B 10/17* (2006.01)
*H01S 3/10* (2006.01)

(52) U.S. Cl. ............... 359/341.4; 359/333; 372/25; 372/29.011

(58) Field of Classification Search ............ 359/333, 359/341.4; 372/25, 29.011
See application file for complete search history.

(56) References Cited

U.S. PATENT DOCUMENTS

| | | | | |
|---|---|---|---|---|
| 5,121,240 | A * | 6/1992 | Acampora | 398/101 |
| 5,499,134 | A * | 3/1996 | Galvanauskas et al. | 359/333 |
| 5,828,680 | A * | 10/1998 | Kim et al. | 372/18 |
| 6,072,765 | A | 6/2000 | Rolland et al. | |
| 6,590,910 | B2 * | 7/2003 | Lin | 372/18 |
| 6,661,816 | B2 | 12/2003 | Delfyett et al. | |
| 6,671,298 | B1 | 12/2003 | Delfyett et al. | |
| 6,690,686 | B2 | 2/2004 | Delfyett et al. | |
| 6,735,229 | B1 | 5/2004 | Delfyett et al. | |
| 6,801,551 | B1 | 10/2004 | Delfyett et al. | |
| 6,920,263 | B2 * | 7/2005 | Tadakuma et al. | 385/27 |
| 7,095,772 | B1 * | 8/2006 | Delfyett et al. | 372/50.22 |
| 7,143,769 | B2 | 12/2006 | Stoltz et al. | |
| 7,245,419 | B2 | 7/2007 | Brennan, III et al. | |
| 7,444,049 | B1 * | 10/2008 | Kim et al. | 385/37 |
| 2003/0012492 | A1 * | 1/2003 | Tadakuma et al. | 385/27 |
| 2004/0000942 | A1 * | 1/2004 | Kapteyn et al. | 327/306 |
| 2004/0263949 | A1 * | 12/2004 | Gu et al. | 359/333 |
| 2005/0213630 | A1 | 9/2005 | Mieke et al. | |

(Continued)

OTHER PUBLICATIONS

Kane et al, "Grating Compensation of Third-Order Material Dispersion in the Normal Dispersion Regime: Sub-100-fs Chirped-Pulse Amplification using a Fiber Stretcher and Grating-Pair Compressor", IEEE Journal of Quantum Electronics, vol. 31, No. 11, pp. 2052-2057 (Nov. 1995).*

(Continued)

*Primary Examiner*—Eric Bolda
(74) *Attorney, Agent, or Firm*—Brian S. Steinberger; Phyllis K. Wood; Law Offices of Brian S. Steinberger, P.A.

(57) ABSTRACT

Methods and systems for optical chirped pulse amplification and phase dispersion, the system including an active dispersion controller for receiving an input optical pulse from a modelocked laser and controlling a third and fourth order dispersion property of the input optical pulse to produce an optical output pulses, a stretching re-circulating loop for stretching the optical output pulses in time, an optical amplifier for amplifying the stretched optical output pulses, a compressing re-circulating loop for compressing the amplified stretched optical output pulse to produce a compressed optical output pulse, and a feedback loop for feeding a feedback optical signal to the active dispersion controller.

14 Claims, 13 Drawing Sheets

U.S. PATENT DOCUMENTS

2006/0126679 A1* 6/2006 Brennan et al. ............... 372/30
2006/0210275 A1   9/2006 Vaissie et al.
2007/0121686 A1   5/2007 Vaissie et al.

OTHER PUBLICATIONS

P.J. Delfyett, S. Gee, M.T. Choi, H. Izadpanah, W. Lee, S. Oxharar, F. Quinlan, T. Yimaz, "Optical Frequency Combs From Semiconductor Lasers and Applications in Ultrawideband Signal Processing and Communications" J. Lightwave Technol., vol. 7, No. 7, pp. 2701-2719, Jul. 2006.

S. Gee, S. Ozharar, F. Quinlan, J.J. Plant, P.W. Juodawlkis, P.J. Delfyett, "Self Stabilization of an Actively Mode-Locked Semiconductor-based Fiber-ring Laser for Ultralow Jitter" IEEE Photon. Technol. Lett., vol. 19, No. 7, pp. 498-500, Apr. 1, 2007.

T. Yilmaz, C.M. Depriest, A. Braun, J. Abeles, P.J. Delfyett, "Noise in Fundamental and Harmonic Modelocked Semiconductor Lasers: Experiments and Simulations" J. Quantum Electon., vol. 39, No. 7, pp. 838-849, Jul. 2003.

N. Yu, E. Salik, L. Maleki, "Ultalow-noise Mode-Locked Laser with Coupled Optoelectronic Oscillator Configuration" Optics Letters., vol. 30, No. 10, pp. 1231-1233, May 15, 2005.

S. Gee, S. Ozharar, F. Quinlan, P.J. Delfyett, "High Precision Measurement of Free Spectral Range of Etalon" Electon. Lett., vol. 42, No. 12, pp. 715-716, Jun. 8, 2006.

J.M. Kahn, "Modulation and Detection Techniques for Optical Communication Systems" in Optical Amplifiers and Their Applications and Coherent Optical Technologies and Applications on CD-ROM (The Optical Society of America, Washington, DC, 2006), CThC1, 3 pages.

F. Quinlan, S. Gee, S. Ozharar, P.J. Delfyett, "Frequency Stabilized Low Timing Jitter Mode-Locked Laser with an Intracavity Etalon" in Conference on Lasers and Electro-Optics/Quantum Electronics and Laser Science Conference and Photonic Applications Systems Technologies 2007 Technical Digest )Optical Society of America, Washington, DC, 2007), CThHH6, 2 pages.

R.W. Drever, J.L. Hall, F.V. Kowalski, J. Hough, G.M. Ford, A.J. Munley, H. Ward, "Laser Phase and Frequency Stabilization Using an Optical Resonator" Appl. Phys. B vol. 31, pp. 97-105, 1983.

Erik Hellstrom, Henrik Sunnerud, Mathias Westlund, Magnus Karlsson, "Third-Order Dispersion Compensation Using a Phase Modulator" Journal of Lightwave Technology, vol. 21, No. 5, May 2003, pp. 1188-1197.

* cited by examiner

EXTREME CHIRPED PULSE AMPLIFICATION AND PHASE CONTROL

This application claims the benefit of priority to U.S. Provisional Application No. 60/900,634 filed on Feb. 9, 2007.

FIELD OF THE INVENTION

This invention relates to lasers and, in particular, to methods, systems, apparatus and devices for a system for extreme pulse stretching, amplification and compression for an ultrashort pulse laser.

BACKGROUND AND PRIOR ART

In amplifiers for ultrashort optical pulses, the occurring optical peak intensities can become very high, so that detrimental nonlinear pulse distortion or even destruction of the gain medium or of some other optical element may occur. This can be effectively prevented by employing the method of chirped-pulse amplification.

Before passing the amplifier medium, the pulses are chirped and temporally stretched to a much longer duration by means of a strongly dispersive element (the stretcher, e.g. a grating pair or a long fiber). This reduces the peak power to a level where the above mentioned detrimental effects in the gain medium are avoided. After the gain medium, a dispersive compressor is used, i.e., an element with opposite dispersion (typically a grating pair), which removes the chirp and temporally compresses the pulses to a duration similar to the input pulse duration. As the peak power becomes very high at the compressor, the beam diameter on the compressor grating has to be rather large. For the most powerful devices, a beam diameter of the order of one meter is required.

The method of chirped pulse amplification has allowed the construction of table-top amplifiers which can generate pulses with millijoule energies and femtosecond durations, leading to peak powers of several terawatts. For the highest peak powers in ultrashort pulses, amplifier systems consisting of several regenerative and/or multipass amplifier stages are used, which are mostly based on titanium-sapphire crystals. Such amplifiers can be used e.g. for high harmonic generation in gas jets. Large-scale facilities even reach peak powers in the petawatt range.

When ordinary holographic diffraction gratings are used for the compressor, the four reflections on gratings can easily cause a loss of approximately 50%. In order not to lose half of the power at the end, special transmission gratings, fabricated with electron beam lithography, have been developed with losses of only approximately 3% or even less per reflection (at least for one polarization direction), resulting in much better efficiency of chirped-pulse amplifier systems. Another possibility is to use volume Bragg gratings. A single such grating can be used as the stretcher and compressor.

Another approach to reduce the compressor losses is down chirped pulse amplification, where the stretcher uses anomalous dispersion so that the compressor can be a simple glass block with normal dispersion.

For ultrabroad optical spectra, as are associated with few-cycle laser pulses, the main challenge of the CPA technique is to obtain a sufficiently precise match of the dispersion of stretcher and compressor despite the large stretching/compressing ratio. This is difficult due to higher-order chromatic dispersion. On the other hand, systems for relatively long (picosecond) pulses require enormous amounts of chromatic dispersion, which are not easily provided. Therefore, CPA systems work best for pulse durations between roughly 20 fs and a few hundred femtoseconds.

The concept of chirped pulse amplification is also applied to fiber amplifiers. Due to the inherently high nonlinearity of long fibers, CPA has to be applied already for relatively low pulse energies, and even with strong temporal stretching of the pulses, the achievable pulse energies stay quite limited. However, high average powers of tens of watts or even >100 W can be generated. Fiber-based CPA systems are therefore most suitable for high pulse repetition rates combined with high average powers. The fibers used for such systems should be optimized in various respects; they should have features such as e.g. a high gain per unit length, polarization-maintaining properties (strong birefringence), core-less end caps, etc.

Unfortunately, all-fiber solutions are normally not possible, since the temporal compression has to be done with a dispersive compressor with a mode area well above that of a fiber. There is some progress, though, towards air-guiding photonic crystal fiber compressors, which at least allow significantly higher pulse energies than previously considered to be realistic for fibers.

SUMMARY OF THE INVENTION

A primary objective of the invention is to provide apparatus, methods, systems and devices for an extreme pulse stretching, amplification and compression system for an ultrashort pulse laser.

A secondary objective of the invention is to provide apparatus, methods, systems and devices for signal from a system with a mode locked laser output pulse that is stretched in time, amplified and compressed a maximum of two amplification stages.

A third objective of the invention is to provide apparatus, methods, systems and devices for an extreme pulse stretching and compression circuit using commercially available fiber-based components.

A fourth objective of the invention is to provide apparatus, methods, systems and devices for a compact extreme pulse stretching and compression circuit for an ultrashort pulse laser.

A first embodiment provides an optical system for chirped pulse amplification and phase dispersion. The optical system includes an active dispersion controller for receiving an input optical pulse from a mode locked laser and controlling a third and fourth order dispersion property of the input optical pulse to produce an optical output pulses, a stretching re-circulating loop serially connected to the active dispersion controller for stretching the optical output pulses in time, an optical amplifier serially connected to the stretching circuit for amplifying the stretched optical output pulses, a compressing re-circulating loop serially connected to the output of the optical amplifier for compressing the amplified stretched optical output pulse to produce a compressed optical output pulse, and a feedback loop connected between an output of the compression re-circulating loop and the active dispersion controller for feeding a feedback optical signal to the active dispersion controller for adjusting the third and fourth order dispersive property of the active dispersion controller to actively fine tune the optical output pulses.

The stretching re-circulating loop includes a switch for coupling the stretching re-circulating loop between the mode locked laser output and the optical amplifier input to inject the input optical pulse into the stretching re-circulating loop, a stretching optical amplifier connected to the first switch having for receiving and amplifying the input optical pulse, a stretching circulator connected with an output of the stretching optical amplifier for receiving an amplified stretched optical pulse, a stretching chirped fiber Bragg grating, and a circulator connected to an output of the stretching optical amplifier and coupled with the stretching chirped fiber Bragg grating for stretching of the output optical pulse.

The compressing re-circulating loop includes a switch for coupling the compressing re-circulating loop between the optical amplifier output and the feedback loop to inject the amplified stretched optical signal into the compressing re-circulating loop, the compressing re-circulating loop producing the compressed output pulse, a compression optical amplifier for receiving and amplifying the amplified stretched optical pulse, a compressing circulator connected with an output of the compressing optical amplifier for re-circulating the compressed optical signal within the compressing re-circulating loop, and a compression chirped fiber Bragg grating coupled between the feedback loop and the compressing circulator for outputting a compression feedback pulse.

The optical system includes a feedback loop having an intensity auto correlation diagnostic device connected to the second switch for receiving a portion of the compressed output pulse and a proportional/integral/differential controller connected between the output of the auto correlation diagnostic device and the active dispersive controller for generating the feedback optical signal.

A second embodiment provides a method for generating an optical output pulse stretched in time, amplified and compressed. A dispersive property of an input optical pulse from a mode locked laser is adjusted, the adjusted optical pulse is stretched in a stretching re-circulating loop, then amplified and the amplified stretched optical pulse is compressed in a compression re-circulating loop to produce a compressed output optical pulse. A portion of the compressed output optical pulse is actively fine tuned and coupled into at least one of the stretching and the compressing re-circulating loops.

Further objects and advantages of this invention will be apparent from the following detailed description of preferred embodiments which are illustrated schematically in the accompanying drawings.

DESCRIPTION OF THE PREFERRED EMBODIMENTS

Before explaining the disclosed embodiments of the present invention in detail it is to be understood that the invention is not limited in its application to the details of the particular arrangements shown since the invention is capable of other embodiments. Also, the terminology used herein is for the purpose of description and not of limitation.

The following is a list of the reference numbers used in the drawings and the detailed specification to identify components:

| 100 | element | 292 | chirped fiber Bragg grating |
|---|---|---|---|
| 110 | modelocked laser | 295 | circulators |
| 120 | active dispersion device | 296 | chirped fiber Bragg grating |
| 130 | extreme stretching device | 300 | phase compensation circuit |
| 140 | optical amplifier | 310 | a sinewave generator |
| 150 | extreme compression stage | 320 | pulse generator |
| 170 | auto correlation device | 330 | circulator |
| 180 | PID controller | 335 | arbitrary waveform |
| 200 | alternative circuit diagram | 340 | phase modulator |
| 225 | 2-x-2 switch | 350 | phase compensated output |
| 230 | stretching loop | 500 | stretching circuit |
| 235 | optical amplifier | 510 | laser source |
| 240 | optical amplifier | 520 | dispersion device |
| 245 | 2-x-2 switch | 522 | EDFA 5 |
| 250 | compressing loop | 525 | pulse picker |
| 255 | optical amplifier | 527 | 2-by-2 switch |
| 260 | auto correlation | 535 | semiconductor optical amplifier |
| 280 | PID controller | 592 | chirped fiber Bragg grating |
| 285 | PID controller | | |

Figure 1:
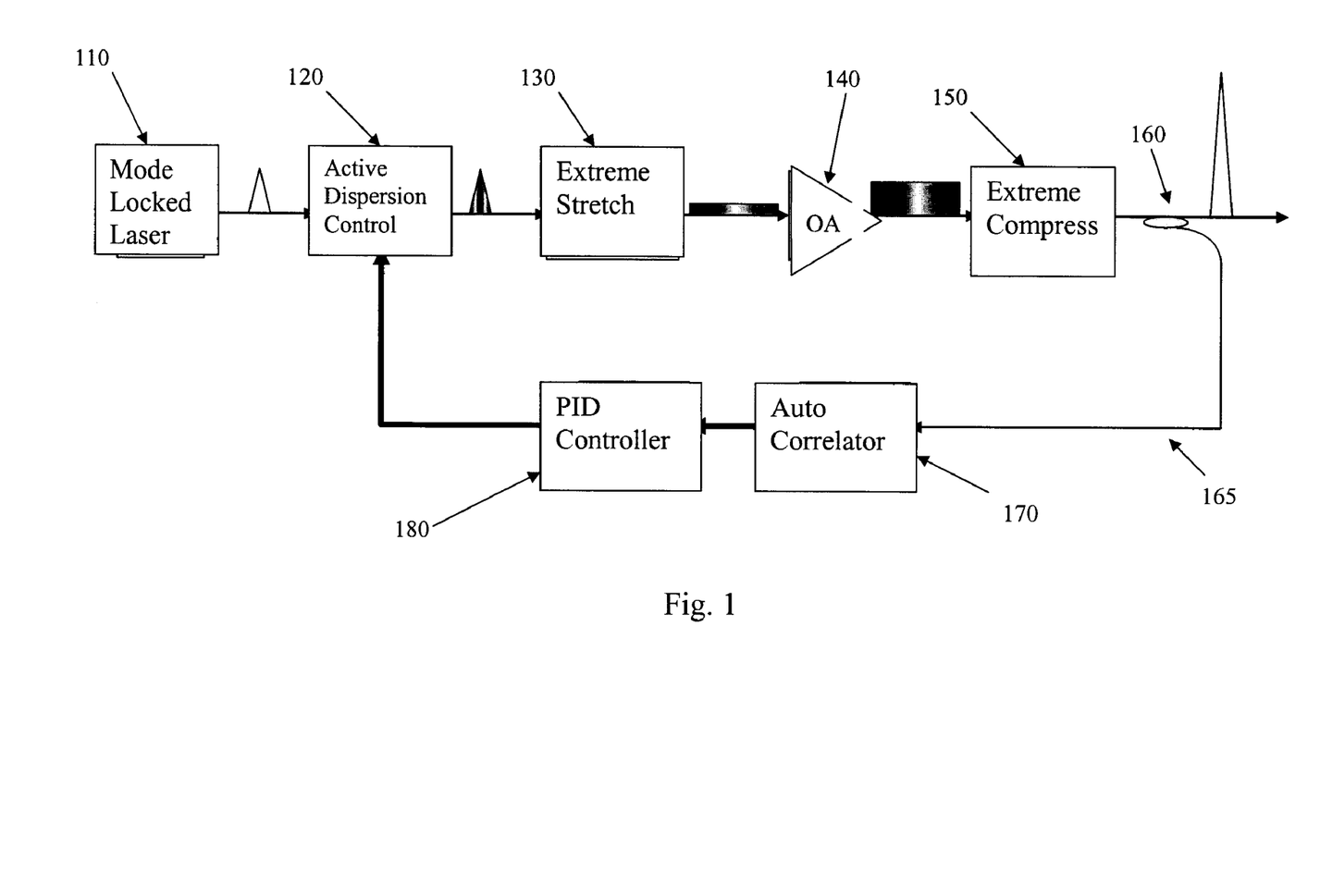
FIG. 1 is a schematic block diagram showing the extreme stretch and compression configuration according to the present invention.

FIG. 1 is a schematic block diagram showing the extreme stretch and compression configuration according to the present invention. As shown, optical output pulses are generated from a mode locked laser 110 and the optical output pulses are passed through an active dispersion device 120 that controls the third and fourth order dispersive terms of the laser output pulses. The optical pulse output of the active dispersion control device 120 is passed through and extreme stretching stage 130, followed by optical amplification 140 and an extreme compression stage 150. A portion of the amplified and compressed optical pulses 160 are characterized by optical intensity auto correlation techniques 170 and the resulting signal is used as an input signal to a feedback loop comprised of a proportional-integral-differential (PID) controller 180. The output of the PID controller 180 is used to adjust the third and fourth order dispersive property of the active dispersion controller 120, to maximize the optical intensity auto correlation measurement.

Figure 2:
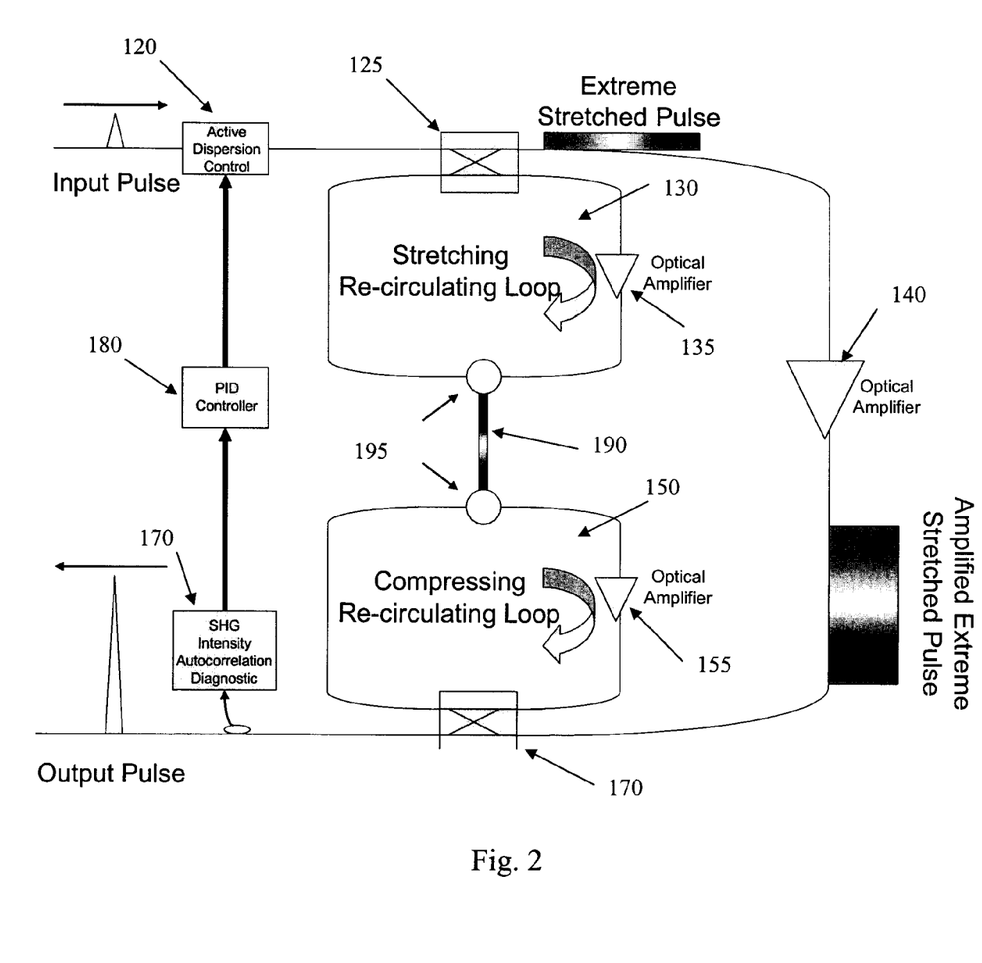
FIG. 2 is a schematic block diagram showing the extreme stretch and compression configuration using a single chirped fiber Bragg grating according to an embodiment of the present invention.

FIG. 2 is a schematic block diagram showing the extreme stretch and compression configuration using a single chirped fiber Bragg grating 190 and two re-circulating loop mirrors.

As shown, the stretching loop includes a 2-x-2 lithium biobate switching device 125 and the compressing loops includes a 2-x-2 lithium biobate switching device 145. The stretching loop 130 and the compressing loop 150 share a single chirped fiber Bragg grating 190 between two re-circulating loop mirrors 195 to realize the extreme stretching and compression. Both the stretching loop 130 and the compressing loop 150 include an optical amplifier 135 and 155, respectively, within the loop. The salient feature using a single chirped fiber Bragg grating is that nonuniformities in the group delay of the chirped fiber Bragg grating, if they exist, that accumulate in the stretching loop 130 are completely removed in the compression loop 150.

Figure 3:
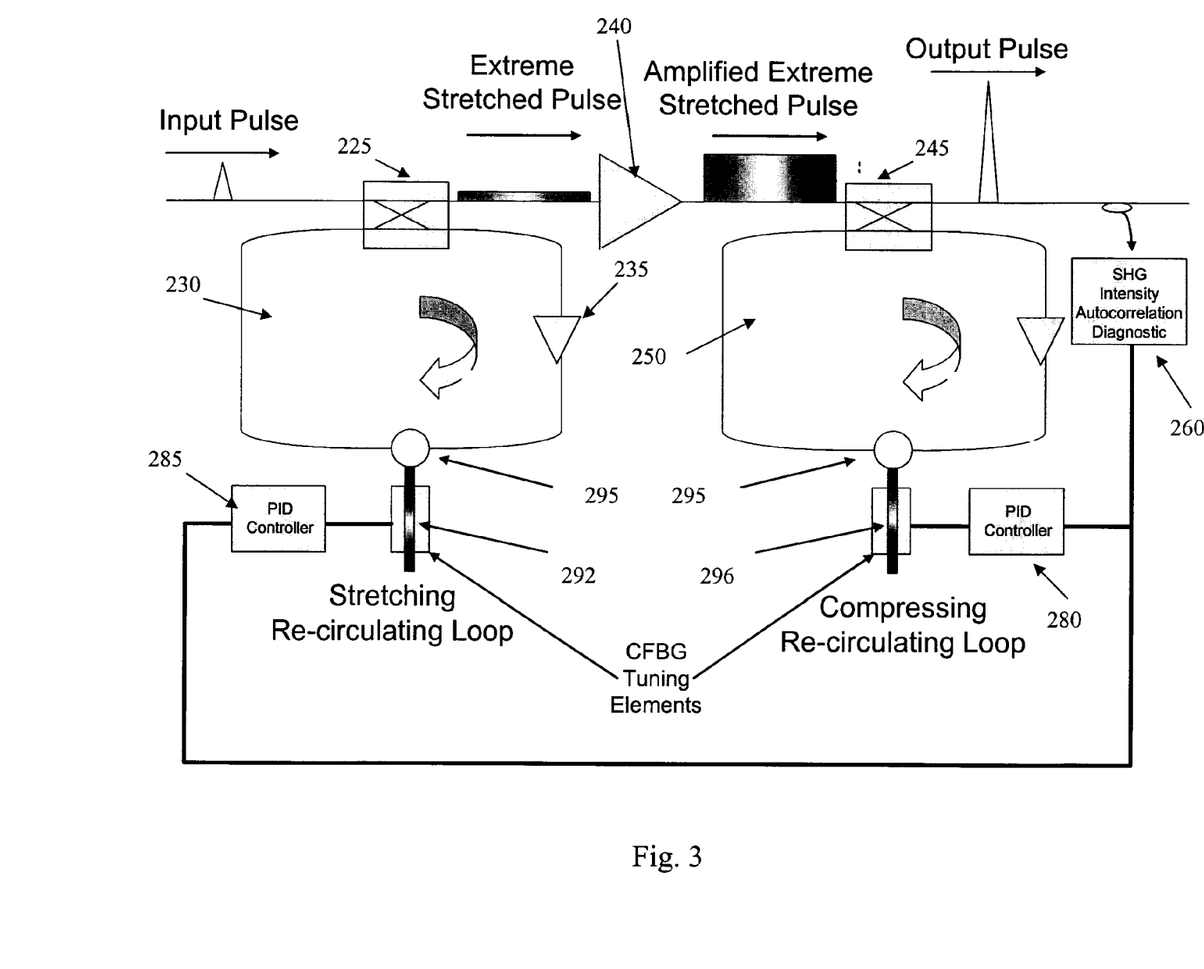
FIG. 3 is a schematic block diagram showing an alternative circuit diagram with each of the stretching and compressing loop each having a chirped fiber Bragg grating according to another embodiment of the present invention.

Alternatively, chirped fiber Bragg gratings that have a shorter physical length resulting in smaller group delay slopes have a uniform group delay, and hence separate or individual chirped fiber Bragg gratings are used. FIG. 3 is a schematic block diagram showing the alternative circuit diagram 200 with each of the stretching loop 230 and the compressing loop 250 each having a chirped fiber Bragg grating 292 and 296, respectively, as a tuning element. As with the first configuration shown in FIG. 2, the alternative configuration shown in FIG. 3 includes an optical amplifier 235 and 255 within the stretching loop 230 and compression loops 250 and a separate re-circulating mirror 294 and 297 coupling the respective loop with the respective chirped fiber Bragg grating. The salient feature of using two separate chirped fiber Bragg gratings is that the optical isolation between the stretching and compression loops is physically achieved much easier.

In the second embodiment shown in FIG. 3, independent proportion-integration-differential controllers for each chirped fiber Bragg grating is required, however, owing to the potential to tune the dispersive properties of a chirped fiber Bragg grating by 50% (e.g. +/−500 psec on a 1000 psec total stretch) one has the potential to have complete continuous dispersion control spanning a range from a minimum of −500 psec to well over 10 nsec, where the upper limit is determined by the initial repetition rate of the modelocked laser and the number of round trips each pulse stays within the circulating loop.

Figure 4:
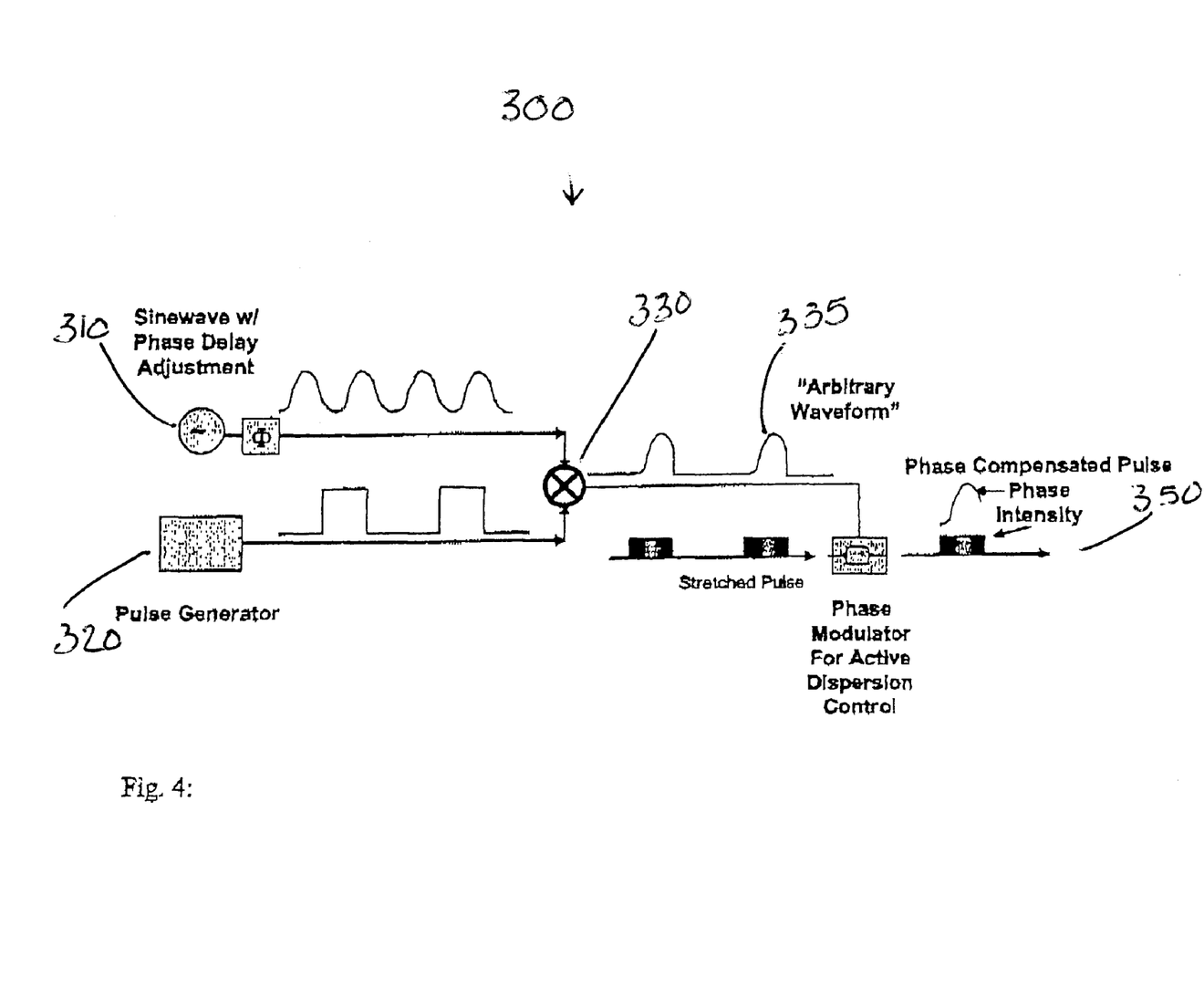
FIG. 4 is a schematic block diagram of for generating an arbitrary RF signal for phase compensation.

FIG. 4 is a schematic block diagram of for generating an arbitrary RF signal for phase compensation. The phase compensation circuit 300 includes two input sources, a sinewave generator 310 with pulse delay adjustment and a pulse generator 320 that are fed into a circulator 330 to generate the output signal having an arbitrary waveform. The arbitrary waveform is modulated by a phase modulator 340 for active dispersion control to generate a phase compensated pulse with a phase intensity as shown in FIG. 4. The phase compensation circuit 300 is a cost effective method for generating an arbitrary RF signal to compensate for the phase distortions associated with optical amplification.

Figure 5:
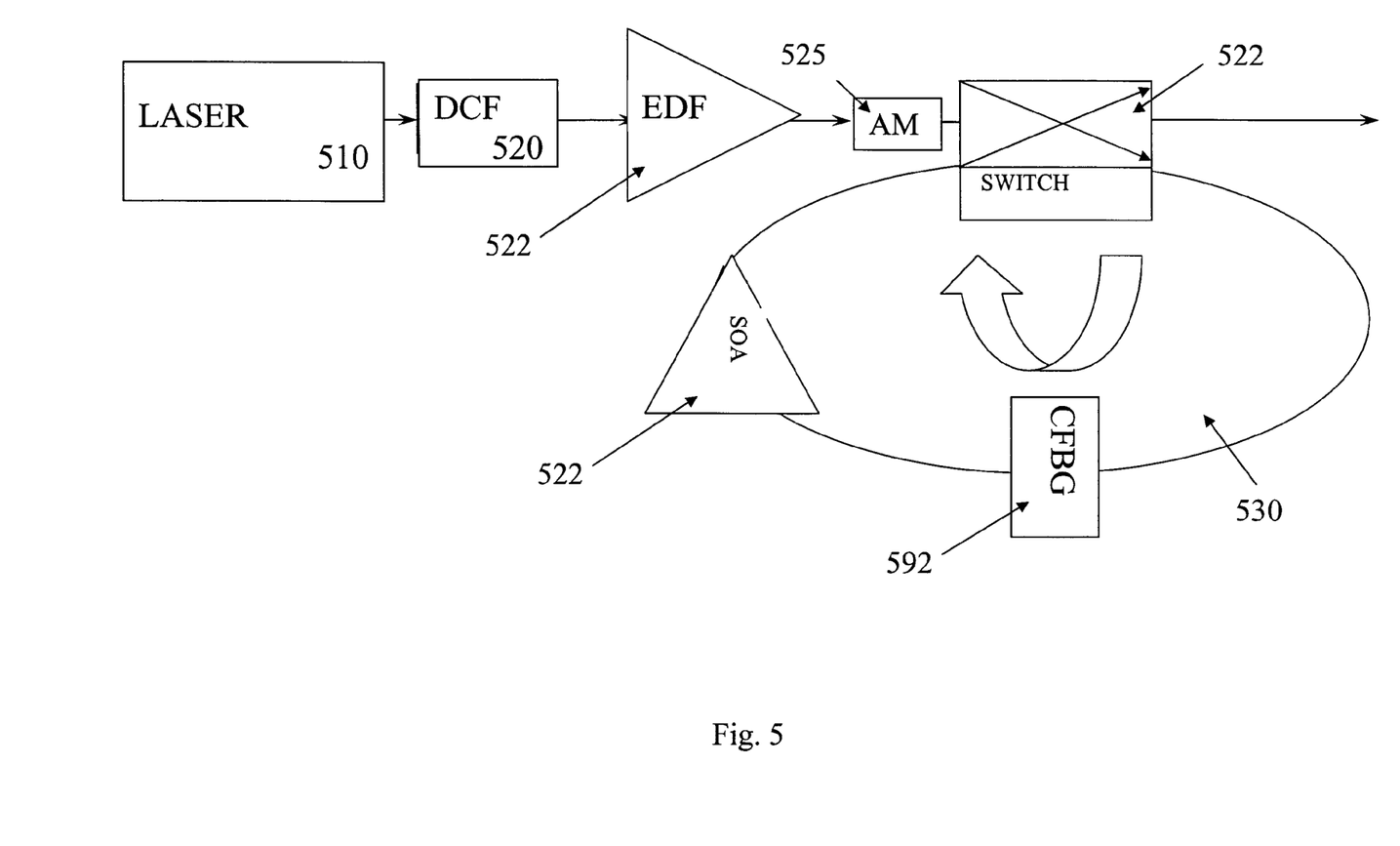
FIG. 5 is a schematic block diagram of the stretching loop.
Figure 6A:
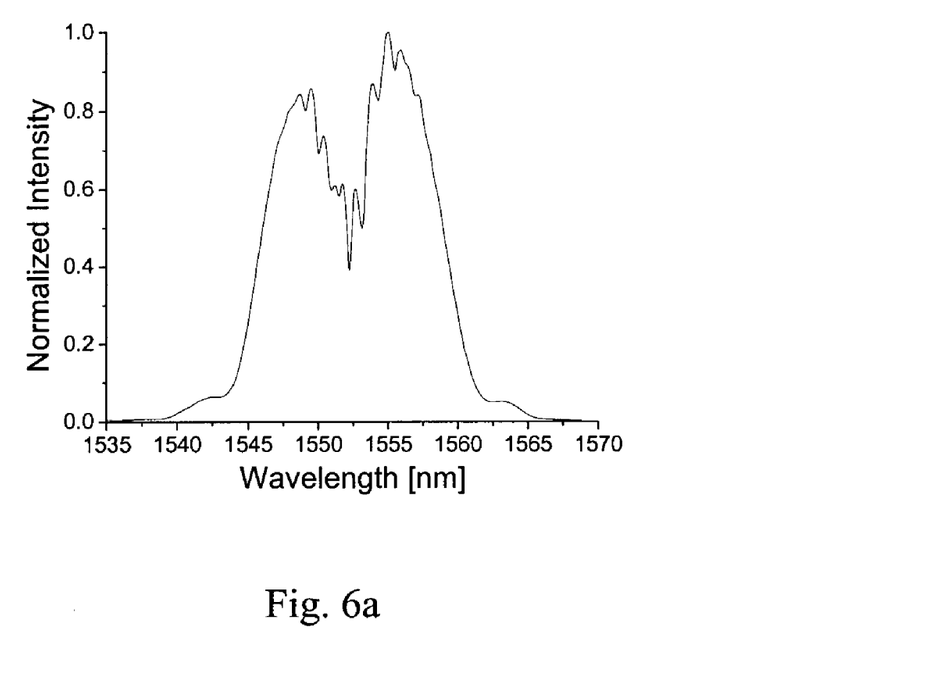
FIGS. 6a and 6b are graphs showing the SPM of the laser pulse through the dispersion device showing the optical spectrum and pulse shape, respectively, with SPM.

Experiments were conducted to show the effects of the extreme stretching according to the present invention. It will be obvious to those skilled in the art that the compression of the stretched and amplified output signal is achieved in a similar manner. FIG. 5 is a schematic block diagram of the stretching loop circuit 500. In this experiment, the laser source 510 in this example is a Calmar laser having a center wavelength of approximately 1552 nm, a spectral bandwidth of approximately 3 nm and a pulse width of approximately 546 fs. The optical output pulse has an output power of approximately 3 mWatt with a repetition rate of approximately 50 nsec. FIG. 6a is a graph showing the optical spectrum of the optical output and FIG. 6a is a graph showing the intensity auto correlation.

Figure 6B:
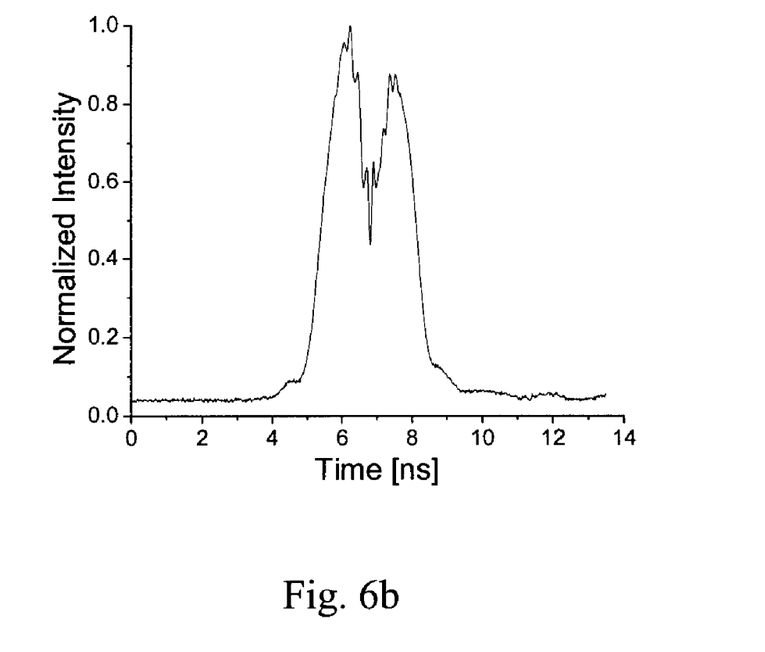
Figure 6C:
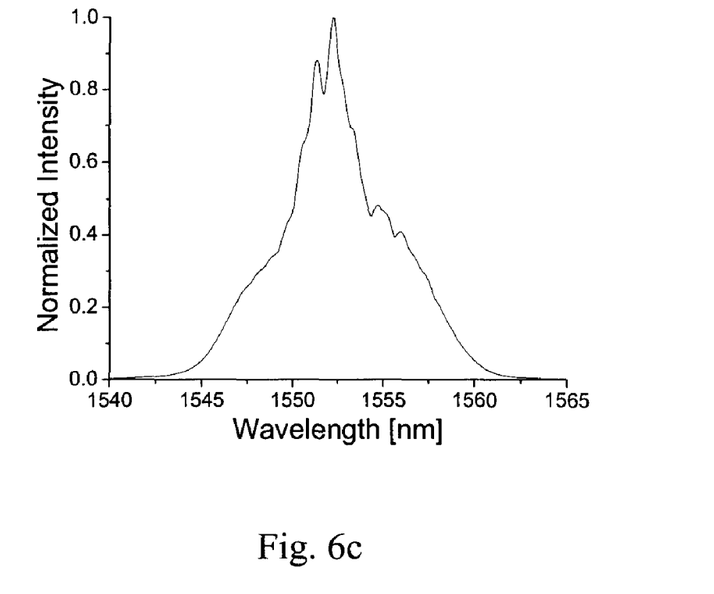
FIGS. 6c and 6d are graphs showing the laser pulse through the dispersion device 520 showing the optical spectrum and pulse shape, respectively, without SPM.
Figure 6D:
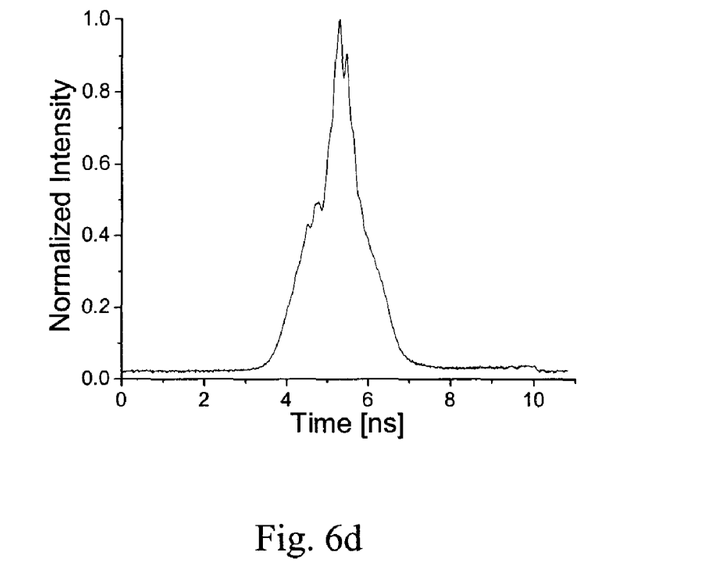
Figure 7:
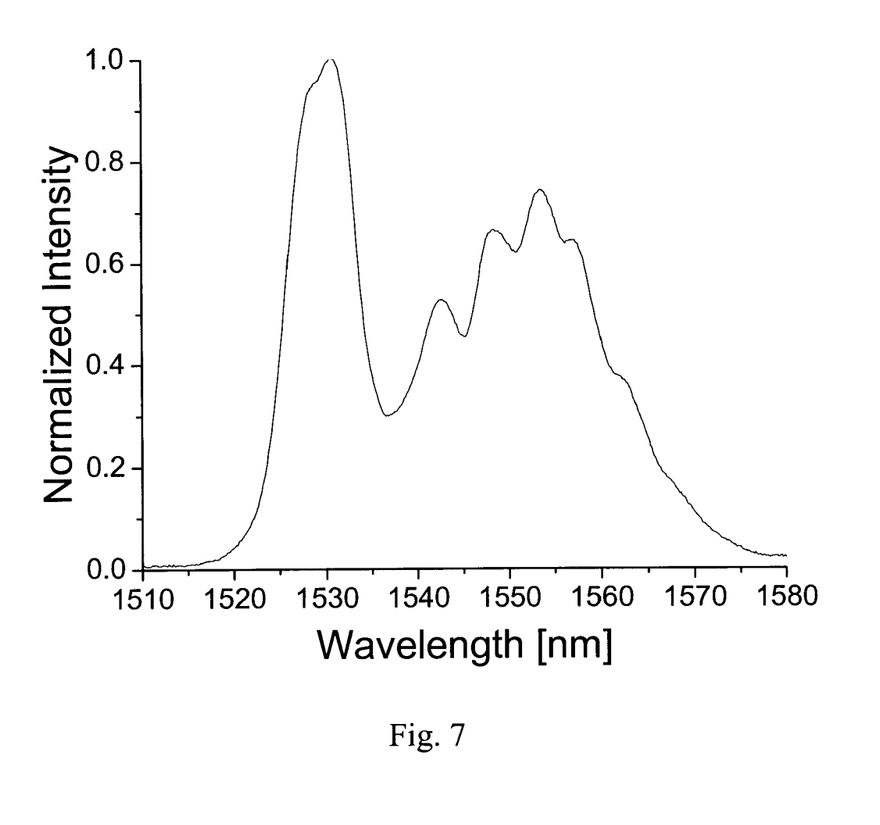
FIG. 7 is a graph showing the EFDA gain spectrum.

Referring back to FIG. 5, the dispersion control device 520 in the circuit has a dispersion of approximately 200 ps/nm and the output optical signal after dispersion is approximately 2 mWatt with a spectral bandwidth of approximately 10 nm. FIGS. 6a and 6b are graphs showing the SPM of the laser pulse through the dispersion device 520 showing the optical spectrum and pulse shape, respectively, with SPM. FIGS. 6c and 6d are graphs showing the laser pulse through the dispersion device 520 showing the optical spectrum and pulse shape, respectively, without SPM. As shown in FIGS. 6c and 6a, the dispersion device output pulse without SPM has an output power of approximately 2.13 mW while the output pulse with SPM is approximately 3.25 mW and the resulting output pulse shape shown in FIG. 6d is much sharper than the pulse with SPM shown in FIG. 6b.

Figure 8A:
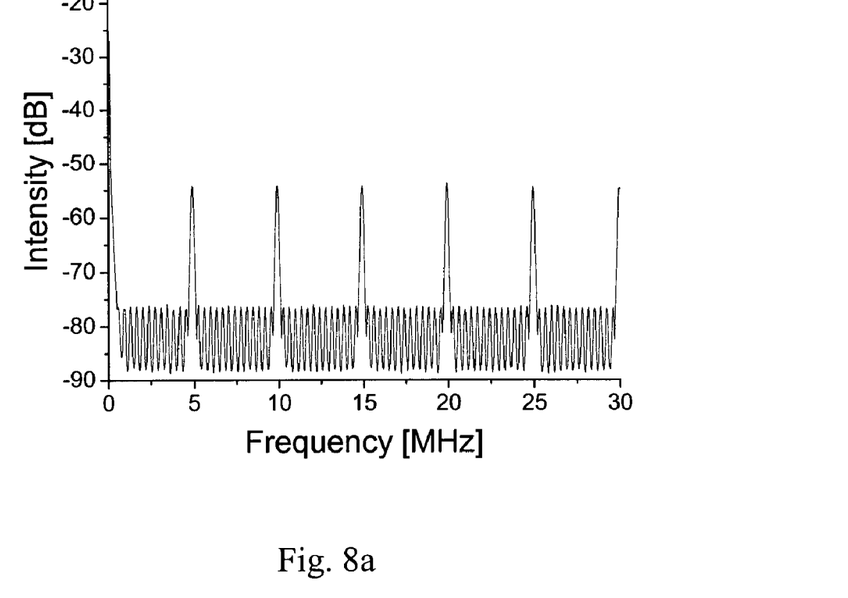
FIG. 8a is a graph showing the RF spectrum with pulse picking at approximately 5 MHz.
Figure 8B:
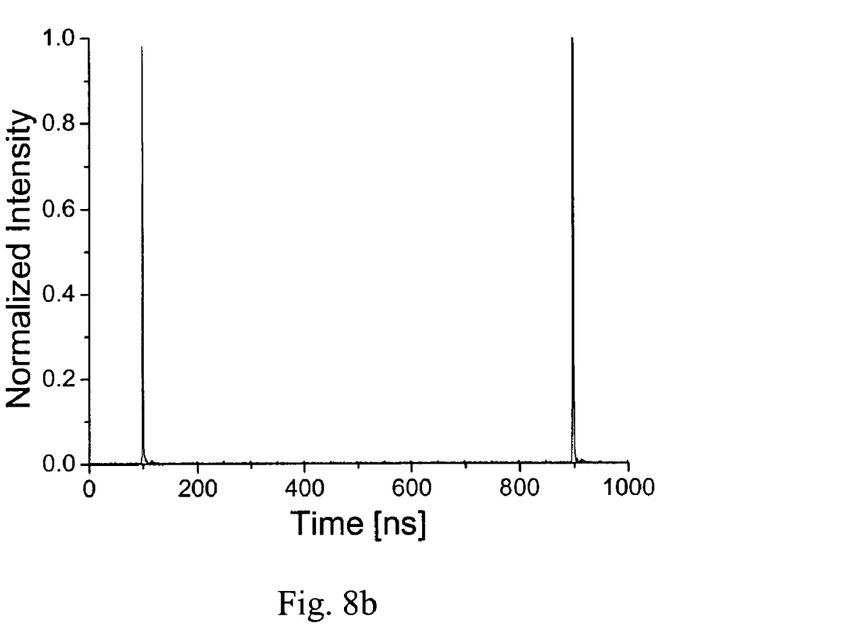
FIG. 8b is a graph showing the optical pulse train with a pulse picking at approximately 1.25 MHz.
Figure 9A:
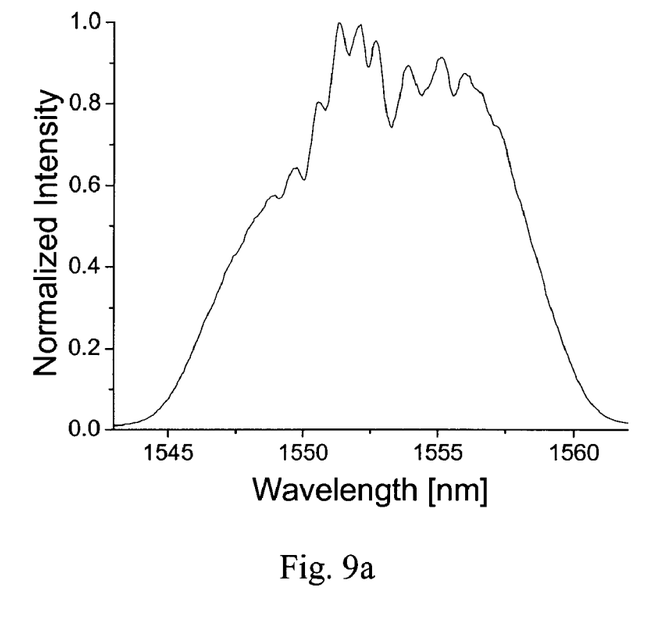
FIG. 9a is a graph showing the optical spectrum of the pre-stretched laser pulse after the pulse picker.
Figure 9B:
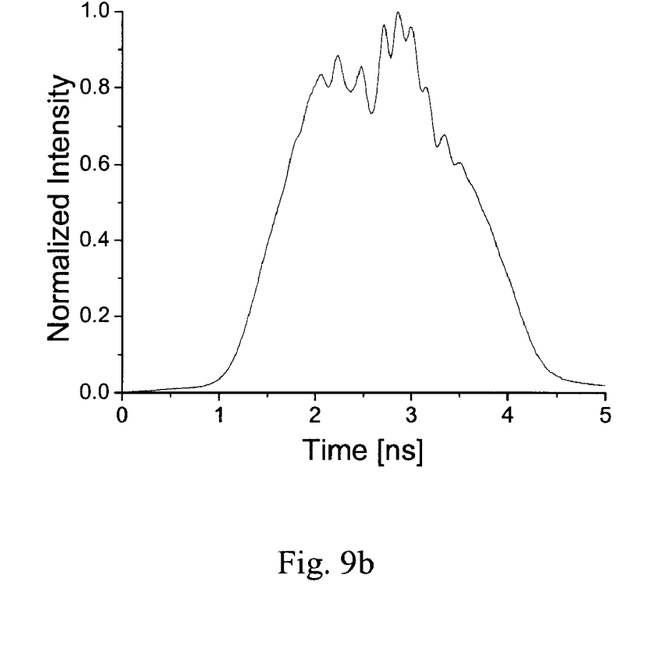
FIG. 9b is a graph showing the pulse shape of the pre-stretched laser pulse after the pulse picker.

The output pulse from the dispersion device 520 is fed into the erbium doped fiber amplifiers (EDFA) 522 which has a pump power of approximately 120 mA and produces an output pulse after EDFA of approximately 16 mW at approximately 2.5 MHz. As shown in FIG. 5, the EDFA output pulse is fed into an AM pulse picker 525 which has an approximately 27 dB extinction and an optical insertion loss of approximately 4.5 dB. The output power of the optical signal after the pulse picker 525 is in a range of approximately 0.37 mW at 1.25 MHz to approximately 0.75 mW at approximately 2.5 MHz repetition rate. FIGS. 8a and 8b are graphs showing the RF spectrum with pulse picking at approximately 5 MHz and optical pulse train with a pulse picking at approximately 1.25 MHz, respectively. FIGS. 9a and 9b are graphs showing the optical spectrum and the pulse shape, respectively, of the pre-stretched laser pulse after the pulse picker.

Figure 10:
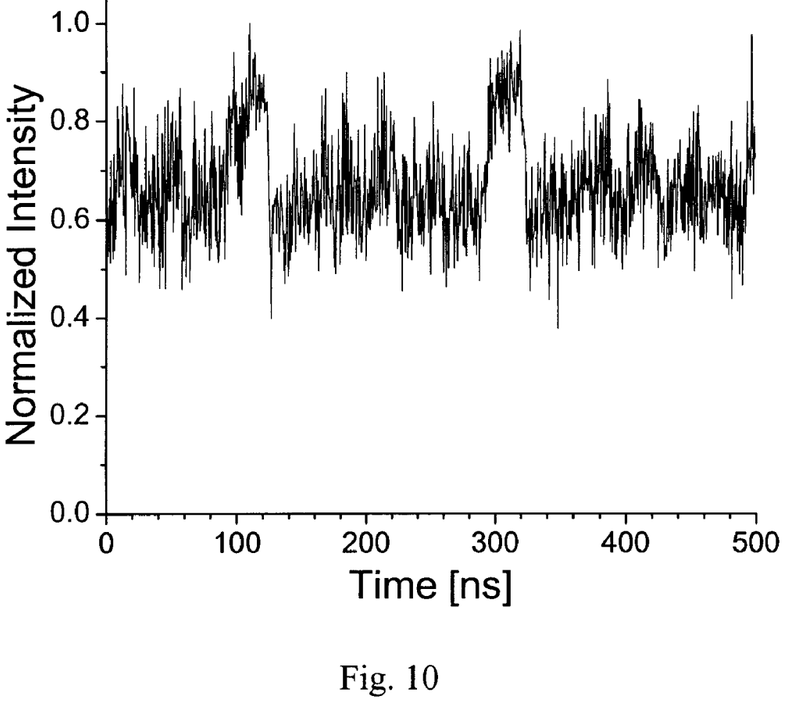
FIG. 10 is a graph showing the switch window with a switching period and the switch pulse width.
Figure 11A:
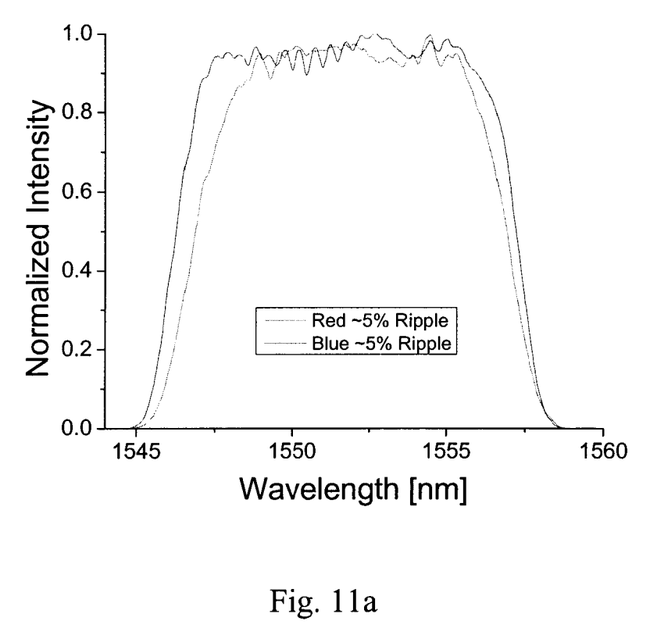
FIGS. 11a and 11b are graphs showing the chirped fiber Bragg grating ripple and reflectance window, respectively.
Figure 11B:
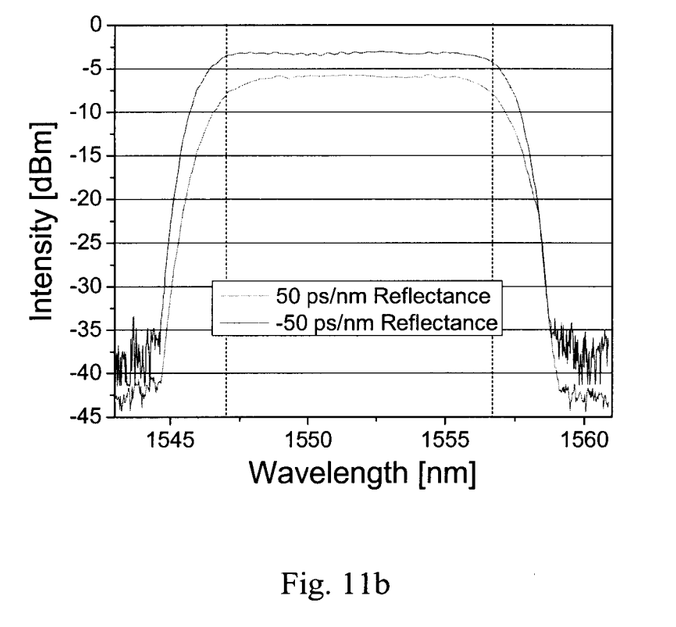

Referring back to FIG. 5, the output pulse from the pulse picker 125 is fed into a 2×2 optical switch 527 which transfers a portion of the pre-stretched laser pulse into the stretching loop 530 where the laser pulse circulates through the chirped fiber Bragg grating 592 and the semiconductor optical amplifier 535 that is used as a continuous wave source at approximately 0.5 mW. The switching window has a switch period of approximately 200 ns and a switch pulse width of approximately 40 ns as shown in FIG. 10. Still referring to FIG. 5, the chirped fiber Bragg grating 592 in the stretching loop 530 has a dispersion of approximately 50 ps/nm with an optical insertion loss in a range of approximately +8 dB and approximately −3 dB. The output power of the pulse after the chirped fiber Bragg gratings is approximately 0.06 mW at a repetition rate of approximately 2.5 MHz. FIGS. 11a and 11b are graphs showing the chirped fiber Bragg grating ripple and reflectance window, respectively.

Figure 12:
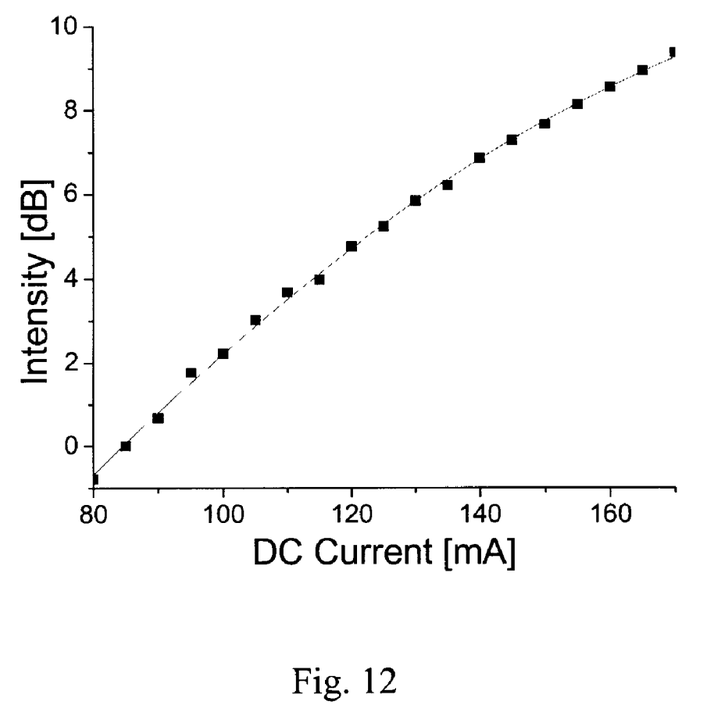
FIG. 12 is a graph showing the semiconductor amplifier gain vs. DC current.

In the stretching loop 530, the pulse from the chirped fiber Bragg grating 592 is fed into the semiconductor optical amplifier 535. The output power of the pulse after amplification is approximately 0.27 mW with a pulse bias of approximately 0.2 mW at approximately 2.5 MHz repetition rate. FIG. 12 is a graph showing the semiconductor amplifier gain vs. DC current.

While the invention has been described, disclosed, illustrated and shown in various terms of certain embodiments or modifications which it has presumed in practice, the scope of the invention is not intended to be, nor should it be deemed to be, limited thereby and such other modifications or embodiments as may be suggested by the teachings herein are particularly reserved especially as they fall within the breadth and scope of the claims here appended.

We claim:

1. An optical system for chirped pulse amplification and phase dispersion comprising:

a active dispersion controller for receiving an input optical pulse from a mode locked laser and controlling a third and fourth order dispersion property of the input optical pulse to produce an optical output pulses;

a stretching re-circulating loop serially connected to the active dispersion controller for stretching the optical output pulses in time;

an optical amplifier serially connected to the stretching circuit for amplifying the stretched optical output pulses;

a compressing re-circulating loop serially connected to the output of the optical amplifier for compressing the amplified stretched optical output pulse to produce a compressed optical output pulse; and a feedback loop connected between an output of the compression re-circulating loop and the active dispersion controller for feeding a feedback optical signal to the active dispersion controller for adjusting the third and fourth order dispersive property of the active dispersion controller to actively fine tune the optical output pulses.

2. The optical system of claim 1, wherein the stretching re-circulating loop comprises:

a first switch for coupling the stretching re-circulating loop between the mode locked laser output and the optical amplifier input to inject the input optical pulse into the stretching re-circulating loop;

an stretching optical amplifier connected to the first switch having for receiving and amplifying the input optical pulse;

a stretching circulator connected with an output of the stretching optical amplifier for receiving an amplified stretched optical pulse;

a stretching chirped fiber Bragg grating; and a circulator connected to an output of the stretching optical amplifier and coupled with the stretching chirped fiber Bragg grating for stretching of the output optical pulse.

3. The optical system of claim 2, wherein the compressing re-circulating loop comprises:

a second switch for coupling the compressing re-circulating loop between the optical amplifier output and the feedback loop to inject the amplified stretched optical signal into the compressing re-circulating loop, the compressing re-circulating loop producing the compressed output pulse;

a compression optical amplifier for receiving and amplifying the amplified stretched optical pulse;

a compressing circulator connected with an output of the compressing optical amplifier for re-circulating the compressed optical signal within the compressing re-circulating loop; and a compression chirped fiber Bragg grating coupled between the feedback loop and the compressing circulator for outputting a compression feedback pulse.

4. The optical system of claim 3, wherein the feedback loop comprises:

an intensity auto correlation diagnostic device connected with an output of the second switch for receiving a portion of the compressed optical output pulse;

a first proportional/integral/differential controller coupled with the compression chirped fiber Bragg grating for receiving a coupled portion of the compressed optical pulse for adjusting a third and fourth order dispersive property of the compression feedback pulse; and a second feedback proportional/integral/differential controller connected with the output of the first proportional/integral/differential controller and the intensity auto correlation diagnostic device for receiving a controlled compression feedback pulse for adjusting a third and fourth order dispersive property of the controlled compression feedback pulse to produce the feedback optical pulse coupled into the stretching re-circulating loop via the stretching chirped fiber Bragg grating.

5. The optical system of claim 1, wherein the stretching and compressing re-circulating loops comprise:

a first switch for coupling the stretching re-circulating loop between the active dispersion controller and the optical amplifier input for injecting the optical output pulse into the stretching re-circulating loop;

a stretching optical amplifier for amplifying the re-circulating stretched optical pulse;

a second switch for coupling the compressing re-circulating loop between the optical amplifier output and the feedback loop for outputting the compressed output optical pulse;

a compression optical amplifier for amplifying the re-circulating compressed optical pulse within the compression re-circulating loop;

a chirped fiber Bragg grating; and a first and second circulator for coupling the stretching re-circulating loop and the compressing re-circulating loop, respectively, to the chirped fiber Bragg grating.

6. The optical system of claim 3, wherein the feedback loop comprises:

an intensity auto correlation device connected to the second switch for receiving a portion of the compressed output pulse; and a proportional/integral/differential controller connected between the output of the auto correlation diagnostic device and the active dispersive controller for generating the feedback optical signal.

7. The optical system of claim 1, wherein the optical amplifier comprises:

an erbium doped fiber amplifier.

8. A method for generating an optical output pulse stretched in time, amplified and compressed comprising the steps of:

producing an input optical pulse from a mode locked laser;

adjusting a dispersive property of the input optical pulse;

stretching the adjusted optical pulse in a stretching re-circulating loop;

amplifying the stretched optical pulse;

compressing the amplified stretched optical pulse in a compression re-circulating loop to produce a compressed output optical pulse; and feeding back a portion of the compressed output optical pulse to at least one of the stretching and compressing re-circulating loops to actively fine tune the compressed output optical pulse.

9. The method of claim 8, wherein the stretching step comprises the steps of:

injecting the adjusted optical pulse into the stretching re-circulating loop;

stretching the optical pulse;

amplifying the stretched optical pulse within the stretching re-circulating loop;

re-circulating the amplified stretched optical pulse within the stretching re-circulating loop; and coupling the amplified stretched optical pulse into the compressing re-circulating loop.

10. The method of claim 9, wherein the compressing step comprises the steps of:

compressing the amplified stretched optical pulse amplifying the compressed optical pulse;

re-circulating the compressed optical pulse; and outputting the compressed optical pulse as an output optical pulse.

11. The method of claim 10, wherein the feedback step comprises the steps of:
- characterizing a portion of the output pulse into an auto-correlation device;
- generating a feedback pulse; and
- actively re-adjusting the dispersive property of the input optical pulse to maximize an optical intensity autocorrelation measurement.

12. The method of claim 8, wherein the feeding back step comprises the steps of:
- characterizing a portion of the compressed output optical pulse;
- adjusting a dispersive property of the characterized output optical pulse; and
- coupling the adjusted optical pulse into the stretching and compressing re-circulating loops.

13. The method of claim 12, wherein the stretching step comprise the steps of:
- inputting the input optical pulse into the stretching re-circulating loop;
- stretching the input optical pulse;
- amplifying the stretched optical pulse within the stretching re-circulating loop;
- mixing the amplified stretched optical pulse with the adjusted optical pulse;
- re-circulating the amplified stretched optical pulse within the stretching re-circulating loop; and
- outputting the adjusted stretched optical pulse.

14. The method of claim 12, wherein the compressing step comprise the steps of:
- inputting the amplified stretched optical pulse into the compressing re-circulating loop;
- compressing the stretched optical pulse;
- amplifying the compressed optical pulse within the compressing re-circulating loop;
- mixing the amplified compressed optical pulse with the adjusted optical pulse;
- re-circulating the amplified compressed optical pulse within the compressing re-circulating loop; and
- outputting the adjusted compressed optical pulse.

* * * * *